(12) United States Patent
Parkin

(10) Patent No.: US 8,845,945 B2
(45) Date of Patent: Sep. 30, 2014

(54) METHOD OF SECURING LOW DENSITY FILLER IN CAVITIES OF A BLADE BODY OF A FAN BLADE

(75) Inventor: Michael Parkin, South Glastonbury, CT (US)

(73) Assignee: United Technologies Corporation, Hartford, CT (US)

(\*) Notice: Subject to any disclaimer, the term of this patent is extended or adjusted under 35 U.S.C. 154(b) by 179 days.

(21) Appl. No.: 13/408,216

(22) Filed: Feb. 29, 2012

(65) Prior Publication Data
US 2013/0220542 A1 Aug. 29, 2013

(51) Int. Cl.
F01D 5/14 (2006.01)
B32B 7/12 (2006.01)
B62B 7/12 (2006.01)

(52) U.S. Cl.
CPC . *F01D 5/147* (2013.01); *B62B 7/12* (2013.01); *F05C 2253/14* (2013.01)
USPC ........ 264/259; 156/245; 156/293; 156/307.7; 264/321; 416/229 R

(58) Field of Classification Search
CPC ....... F01D 5/141; F01D 5/147; F03D 1/0633; F03D 1/0675; F05C 2253/14; B32B 2305/022; B29C 44/3496
USPC .......... 264/266, 267, 321, 259; 156/242, 245, 156/307.7, 331.6, 293, 78; 416/224, 229 R, 416/229 A
See application file for complete search history.

(56) References Cited

U.S. PATENT DOCUMENTS

| | | | |
|---|---|---|---|
| 3,595,059 A | 7/1971 | Erb | |
| 3,873,392 A | 3/1975 | Niebylski et al. | |
| 4,258,889 A * | 3/1981 | Hunt | 244/207 |
| 5,096,384 A * | 3/1992 | Immell et al. | 416/229 R |
| 5,720,597 A | 2/1998 | Wang et al. | |
| 7,138,598 B2 | 11/2006 | Stevenson et al. | |
| 7,594,325 B2 | 9/2009 | Read | |
| 7,794,197 B2 | 9/2010 | Thompson et al. | |
| 2007/0041842 A1* | 2/2007 | Thompson et al. | 416/223 R |
| 2009/0056126 A1* | 3/2009 | Chivers et al. | 29/889.2 |
| 2011/0211965 A1* | 9/2011 | Deal et al. | 416/223 R |

\* cited by examiner

*Primary Examiner* — John Goff
*Assistant Examiner* — Scott W Dodds
(74) *Attorney, Agent, or Firm* — Carlson, Gaskey & Olds, P.C.

(57) ABSTRACT

A method of forming a fan blade includes the step of positioning a piece of low density filler in a cavity of an inner exposed surface of a fan blade body. An upper surface of the piece of low density filler is located above the inner exposed surface of the fan blade body, and the low density filler has a density lower than a density of a material of the fan blade body. The method further includes the steps of positioning the fan blade body in a lower die of a press and applying pressure to the inner exposed surface of the fan blade body with an upper die of the press to compress the low density filler such that the upper surface of the piece of low density filler is approximately flush with the inner exposed surface of the fan blade body.

19 Claims, 5 Drawing Sheets

METHOD OF SECURING LOW DENSITY FILLER IN CAVITIES OF A BLADE BODY OF A FAN BLADE

BACKGROUND OF THE INVENTION

A gas turbine engine includes a fan section that drives air along a bypass flowpath while a compressor section drives air along a core flowpath for compression and communication into a combustor section then expansion through a turbine section.

One example fan blade includes a cover attached to a blade body. An inner surface of the blade body of the fan blade includes cavities. A piece of low density filler is placed into a corresponding cavity in the blade body. An exposed surface of the low density filler must conform closely to a surface of the blade body to enable a robust bond joint to a mating surface of the cover. Due to variation in the manufacturing processes, currently an operator manually applies pressure to any high spots in the low density filler, and then taps the high spots of the low density filler with an instrument so that an upper surface of the low density filler is approximately flush with the inner surface of the blade body to create a smooth surface. A drawback to this method is that it is labor intensive for an operator to manually tap each piece of low density filler.

SUMMARY OF THE INVENTION

A method of forming a fan blade according an exemplary aspect of the present disclosure includes, among other things, the step of positioning a piece of low density filler in a cavity of an inner exposed surface of a fan blade body. An upper surface of the piece of low density filler is located above the inner exposed surface of the fan blade body, and the low density filler has a density lower than a density of a material of the fan blade body. The method further includes the steps of positioning the fan blade body in a lower die of a press and applying pressure to the inner exposed surface of the fan blade body with an upper die of the press to compress the low density filler such that the upper surface of the piece of low density filler is approximately flush with the inner exposed surface of the fan blade body.

In a further non-limited embodiment of any of the forgoing method embodiments, the method may include the step of applying an adhesive in a cavity.

In a further non-limited embodiment of any of the forgoing method embodiments, the method may include the step of placing a low density filler in a cavity after the step of applying an adhesive in the cavity.

In a further non-limited embodiment of any of the forgoing method embodiments, the method may include partially curing an adhesive during the step of applying pressure to an inner exposed surface of a fan blade body.

In a further non-limited embodiment of any of the forgoing method embodiments, the method may include an adhesive that is urethane.

In a further non-limited embodiment of any of the forgoing method embodiments, the method may include a press having a lower die having a contour that matches a contour of an outer surface of a fan blade body.

In a further non-limited embodiment of any of the forgoing method embodiments, the method may include a low density filler of foam.

In a further non-limited embodiment of any of the forgoing method embodiments, the method may include a low density filler of aluminum foam.

In a further non-limited embodiment of any of the forgoing method embodiments, the method may include a fan blade body made of aluminum or an aluminum alloy.

In a further non-limited embodiment of any of the forgoing method embodiments, the method may include a low density filler that is compressed and partially bonded to a fan blade body concurrently.

In a further non-limited embodiment of any of the forgoing method embodiments, the method may include the step of applying pressure to an inner exposed surface of a fan blade body including compressing an upper surface of a piece of low density foam below the inner exposed surface of the fan blade body and then allowing the piece of low density foam to spring back such that the upper surface of the piece of low density foam is substantially flush with the inner exposed surface of the fan blade body.

A method of forming a fan blade according an exemplary aspect of the present disclosure includes, among other things, the steps of applying an adhesive in each of a plurality of cavities of an inner exposed surface of a fan blade body and positioning one of a plurality of pieces of low density filler in each of the plurality of cavities after the step of applying the adhesive in each of the plurality of cavities. An upper surface of the plurality of pieces of low density filler is located above the inner exposed surface of the fan blade body, and the plurality of pieces of low density filler have a density lower than a density of a material of the fan blade body. The method further includes the step of positioning the fan blade body in a lower die of a press, and the lower die of the press has a contour that matches a contour of an outer surface of the fan blade body. The method further includes the step of applying pressure to the inner exposed surface of the fan blade body with an upper die of the press to compress the plurality of pieces of low density filler such that the upper surface of the plurality of pieces of low density filler is approximately flush with the inner exposed surface of the fan blade body.

In a further non-limited embodiment of any of the forgoing method embodiments, the method may include partially curing an adhesive during the step of applying pressure to an inner exposed surface of a fan blade body.

In a further non-limited embodiment of any of the forgoing method embodiments, the method may include an adhesive that is urethane.

In a further non-limited embodiment of any of the forgoing method embodiments, the method may include a press having a lower die having a contour that matches a contour of an outer surface of a fan blade body.

In a further non-limited embodiment of any of the forgoing method embodiments, the method may include a low density filler of foam.

In a further non-limited embodiment of any of the forgoing method embodiments, the method may include a low density filler of aluminum foam.

In a further non-limited embodiment of any of the forgoing method embodiments, the method may include a fan blade body made of aluminum or an aluminum alloy.

In a further non-limited embodiment of any of the forgoing method embodiments, the method may include a low density filler that is compressed and partially bonded to a fan blade body concurrently.

In a further non-limited embodiment of any of the forgoing method embodiments, the method may include the step of applying pressure to an inner exposed surface of a fan blade body including compressing an upper surface of a plurality of pieces of low density foam below the inner exposed surface of the fan blade body and then allowing the plurality of pieces of low density foam to spring back such that the upper surface of the plurality of pieces of low density foam is substantially flush with the inner exposed surface of the fan blade body.

These and other features of the present invention can be best understood from the following specification and drawings, the following of which is a brief description.

DETAILED DESCRIPTION OF THE PREFERRED EMBODIMENT

Figure 1:
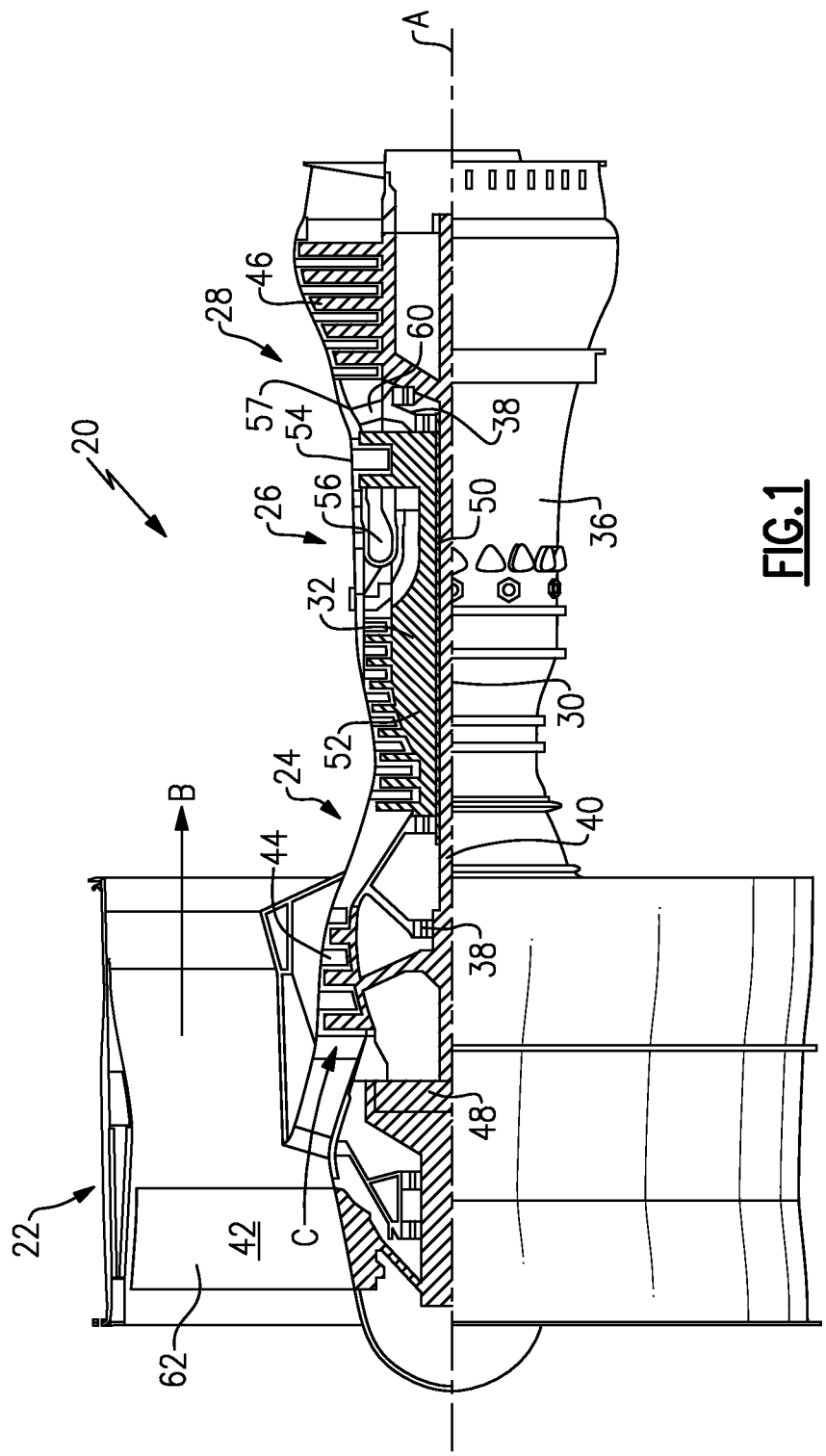
FIG. 1 illustrates a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A, which is collinear with their longitudinal axes.

The core airflow C is compressed by the low pressure compressor 44, then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion.

The engine 20 is in one example a high-bypass geared aircraft engine. In a further example, the engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 feet (10,668 meters), with the engine at its best fuel consumption, also known as "bucket cruise Thrust Specific Fuel Consumption ('TSFC')," is the industry standard parameter of lbm of fuel being burned divided by lbf of thrust the engine produces at that minimum point.

"Low fan pressure ratio" is the pressure ratio across the fan blade alone. The low fan pressure ratio as disclosed herein according to one non-limiting embodiment is less than about 1.45.

"Low corrected fan tip speed" is the actual fan tip speed in feet per second divided by an industry standard temperature correction of $[(Tambient\ deg\ R)/518.7)^{0.5}]$. The "Low corrected fan tip speed" as disclosed herein according to one non-limiting embodiment is less than about 1150 feet per second (351 meters per second).

Figure 2:
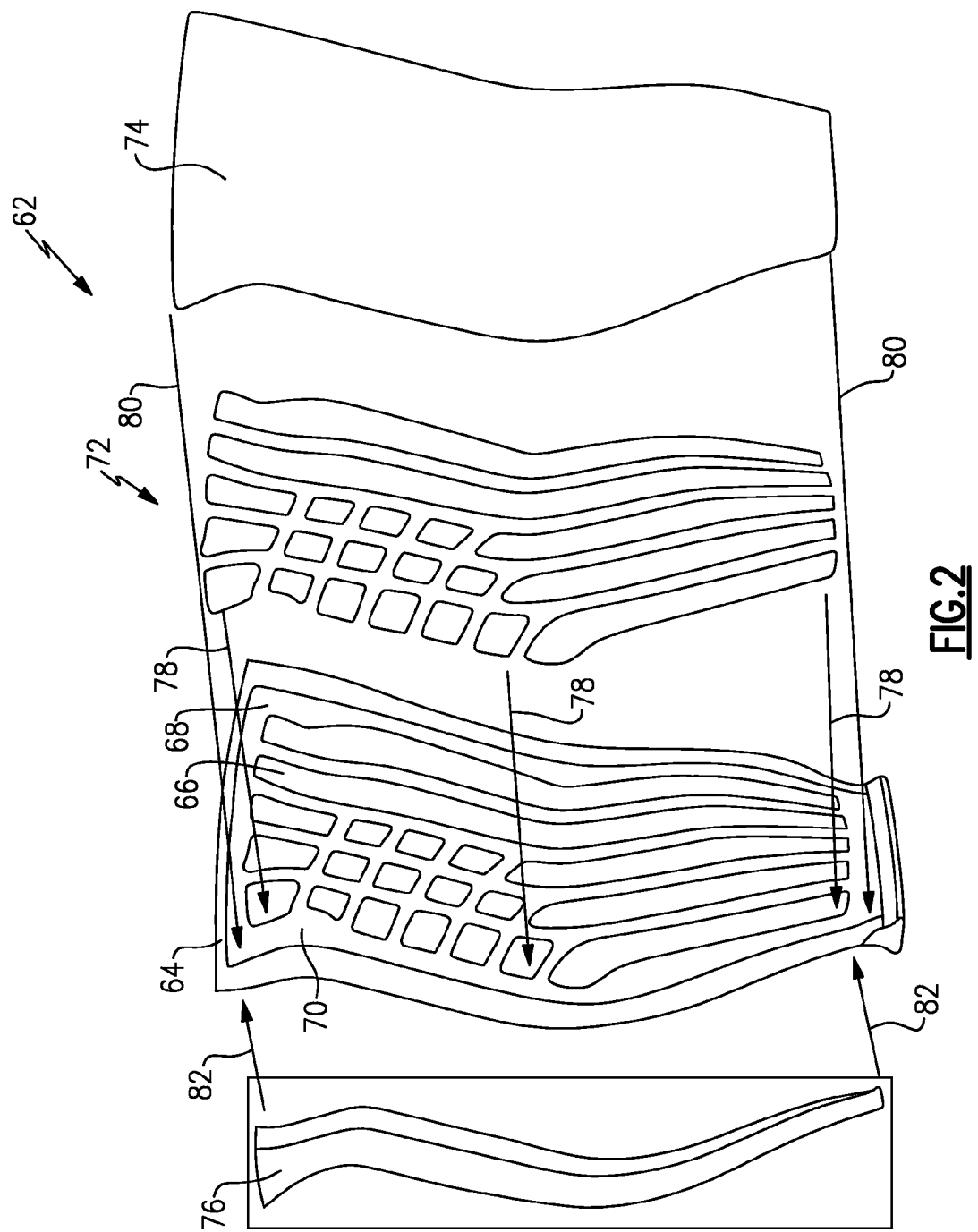
FIG. 2 illustrates an exploded view of a fan blade.

The fan 42 includes a plurality of hybrid metallic fan blades 62. As shown in FIG. 2, each fan blade 62 includes a blade body 64 having an inner surface 70 including a plurality of cavities 66, such as grooves or openings, surrounded by ribs 68. A plurality of strips or pieces of low density filler 72 are each sized to fit in one of the plurality of cavities 66. The fan blade 62 also includes a cover 74 and a leading edge sheath 76 attached to the blade body 64.

In one example, the blade body 64 is made of aluminum or an aluminum alloy. Employing aluminum or an aluminum alloy for the blade body 64 and the cover 74 provides a cost savings. There is one strip or piece of the low density filler 72 for each of the plurality of cavities 66 of the blade body 64. In one example, the low density filler 72 is foam. In one example, the foam is aluminum foam. The low density filler 72 is secured in the cavities 66 with an adhesive 78, shown schematically as arrows. In one example, the adhesive 78 is urethane. In another example, the adhesive 78 is an epoxy film.

The cover 74 is then secured to the blade body 64 with an adhesive 80, shown schematically as arrows. In one example, the adhesive 80 is urethane. In one example, the cover 74 is made of aluminum or an aluminum alloy. The adhesive 80 then cured during a bonding cure cycle in a pressure vessel.

The leading edge sheath 76 is then attached to the blade body 64 with an adhesive layer 82. In one example, the adhesive layer 82 includes an adhesive film supported by a scrim cloth. In one example, the adhesive film is an epoxy film. In one example, the scrim cloth is nylon. In one example, the scrim cloth is mesh in structure. In one example, the leading edge sheath 76 is made of titanium or a titanium alloy. The adhesive film in the adhesive layer 82 is then cured during a sheath bonding cure cycle in an autoclave.

The density of the low density filler 72 less than the density of the material of the blade body 64. In one example, the density of the low density filler 72 is about 8% to 10% of the density of the material of the blade body 64. Employing the low density filler 72 reduces the weight of the blade body 64, but allows for the surface area of the inner surface 70 of the blade body 64 to be smooth to provide sufficient surface area for bonding with the cover 74.

Figure 3:
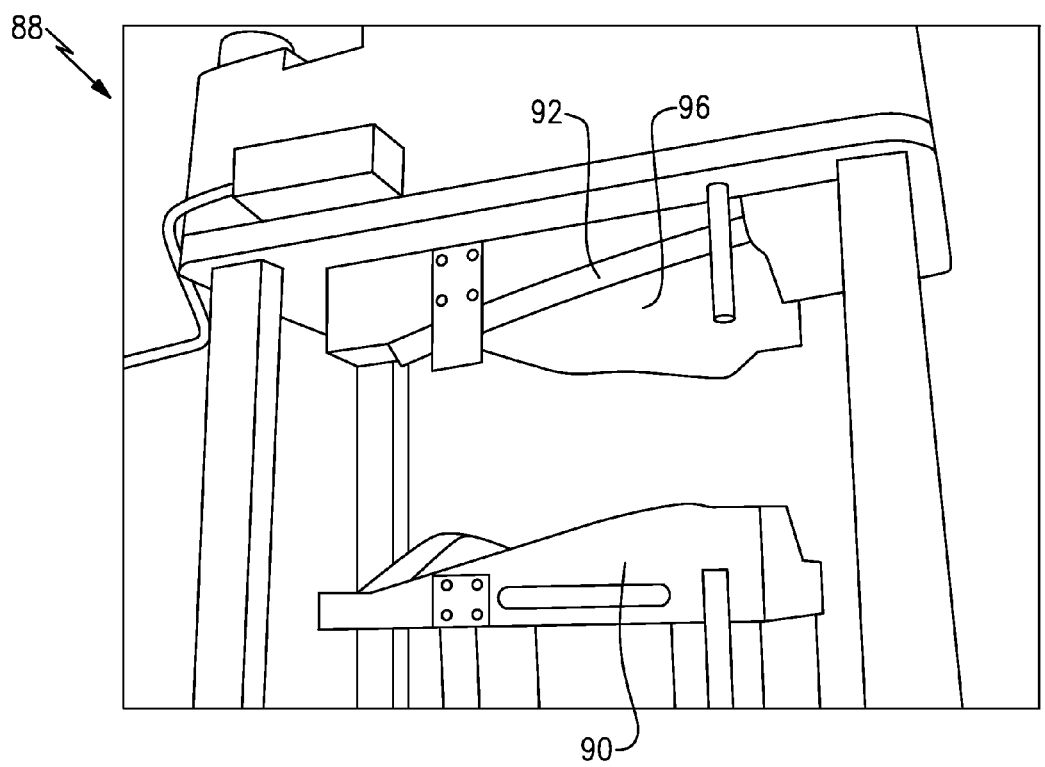
FIG. 3 illustrates a press including an upper die and a lower die.

FIG. 3 illustrates a press 88 including a lower die 90 and an upper die 92. An inner surface 96 of the upper die 92 of the press 88 matches a contour of an outer surface of the cover 74 that will be eventually secured to the blade body 64.

Figure 4:
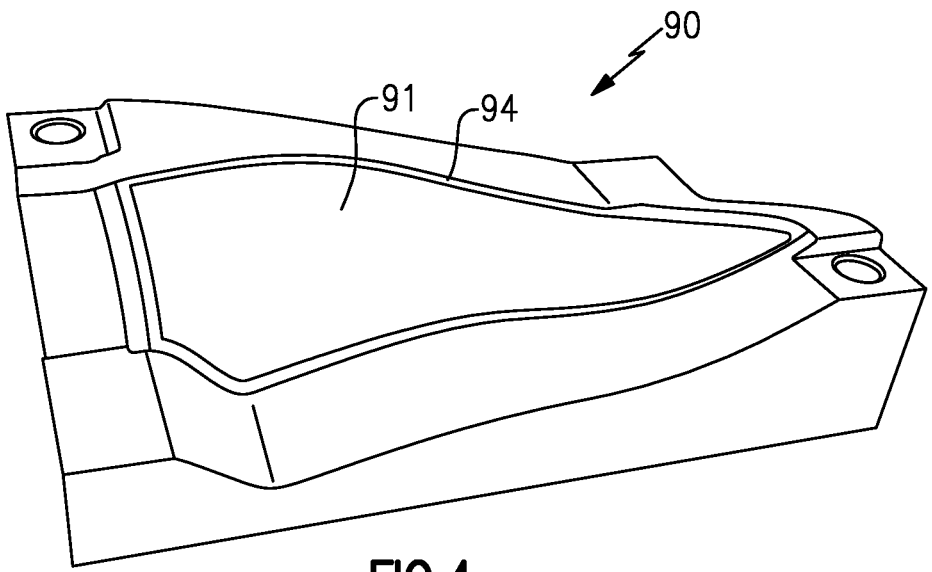
FIG. 4 illustrates the lower die of the press.
Figure 5:
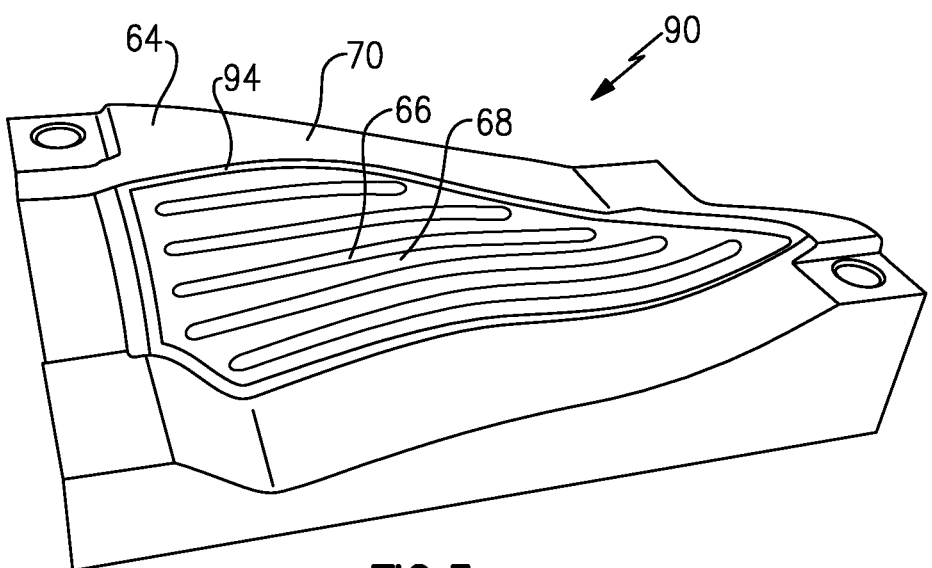
FIG. 5 illustrates the lower die of the press receiving the blade body.

FIG. 4 illustrates the lower die 90 of the press 88. The lower die 90 includes a cavity 91 sunk about 0.3 inch (0.726 mm) to prevent sliding of the blade body 64 in the lower die 90 and to accommodate for the bow/twist shape in an outer surface 86 of the blade body 64 when the blade body 64 is nested in the lower die 90 of the press 88, as shown in FIG. 5. The cavity 91 is defined by walls 94.

Returning to FIG. 2, adhesive 78 is applied in the cavities 66 of the blade body 64. The pre-cut low density filler 72 is then placed in each of the cavities 66. In one example, the low density filler 72 is manually placed in each of the cavities 66. In one example, the low density filler 72 is robotically placed in each of the cavities 66. Each piece of pre-cut low density filler 72 is cut to size to fit in a specific cavity 66.

Figure 6:
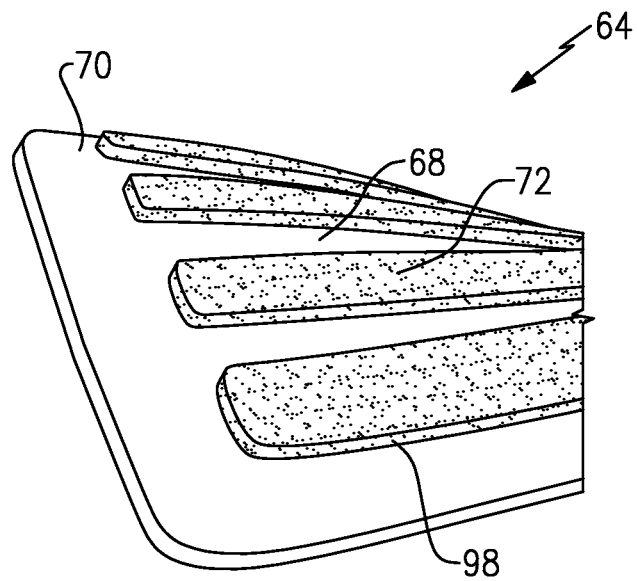
FIG. 6 illustrates low density filler inserted into the cavities in the blade body prior to pressure being applied by the press.

As shown in FIG. 6, when the low density filler 72 is placed in each of the plurality of cavities 66, an upper surface 98 of the low density filler 72 extends above the inner surface 70 of the blade body 64 (this is shown in an exaggerated manner in FIG. 6).

Once the blade body 64 is positioned in the cavity 91 in the lower die 90 of the press 88, a sheet of plastic can be placed on the inner surface 70 of the blade body 64 to provide a barrier between the upper die 92 and the blade body 86. The upper die 92 of the press 88 is lowered and pressed against the inner surface 70 of the blade body 64. The pressure applied by the upper die 92 of the press 88 compresses the low density filler 72.

The upper surface 98 of the low density filler 72 could be pressed slightly below the inner surface 70 of the blade body 64 during pressing to accommodate for any spring back of the low density filler 72 once the upper die 92 is lifted. In one example, the upper surface 98 of the low density filler 72 is compressed so that the height of the low density filler 72 is reduced by about 10%.

Figure 7:
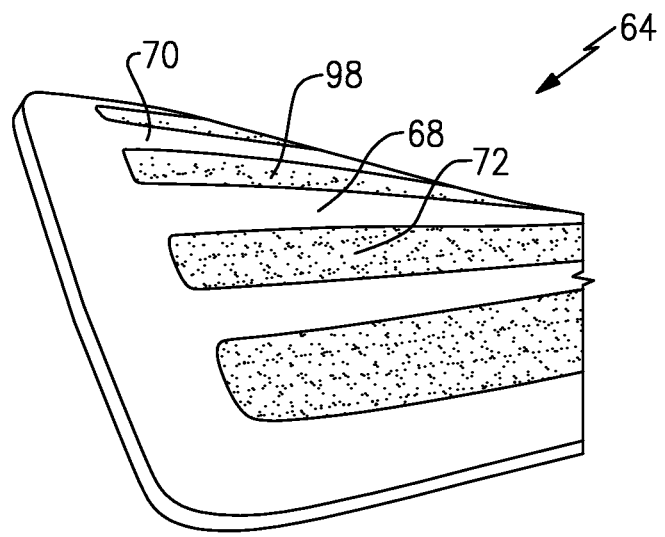
FIG. 7 illustrates the low density filler inserted in the cavities in the blade body after pressure is applied by the press.

As shown in FIG. 7, once the low density filler 72 springs back, the upper surface 98 of the low density filler 98 is approximately flush with the inner surface 70 of the blade body 86 once pressing is complete. This creates a smooth, flush and continuous surface that can form a strong bond with the cover 74. Any spaces that do exist between the upper surface 98 of the low density filler 98 and the cover 74 can be filled in with the adhesive 80. This also eliminates any tolerance stack issues between the blade body 64, the low density filler 72, and the cover 74.

In one example, the press 88 containing the blade body 64 remains closed for approximately 30 to 45 minutes. During this time, the adhesive 78 can begin to partially cure such that the blade body 64 can be removed from the lower die 90 of the press 88 with the low density filler 72 sufficiently bonded in the cavities 66 of the blade body 64. In one example, a pressure of about at least 400 psi is applied. The pressing process combines two steps: compressing the low density filler 72 and assisting in bonding the low density filler 72 to the blade body 64 concurrently.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method of forming a fan blade, the method comprising the steps of:
    positioning a piece of low density filler in a cavity of an inner exposed surface of a fan blade body, wherein an upper surface of the piece of low density filler is located above the inner exposed surface of the fan blade body, and the low density filler has a density lower than a density of a material of the fan blade body;
    positioning the fan blade body in a lower die of a press; and
    applying pressure to the inner exposed surface of the fan blade body with an upper die of the press to compress the low density filler such that the upper surface of the piece of low density filler is approximately flush with the inner exposed surface of the fan blade body, wherein the step of applying pressure to the inner exposed surface of the fan blade body includes compressing the upper surface of the piece of low density filler below the inner exposed surface of the fan blade body and then allowing the piece of low density filler to spring back such that the upper surface of the piece of low density filler is substantially flush with the inner exposed surface of the fan blade body, and
    incorporating the fan blade body into the fan blade.

2. The method as recited in claim 1 including the steps of applying an adhesive in the cavity and placing the low density filler in the cavity after the step of applying the adhesive in the cavity.

3. The method as recited in claim 2 wherein the adhesive is partially cured during the step of applying pressure to the inner exposed surface of the fan blade body.

4. The method as recited in claim 2 wherein the adhesive is urethane.

5. The method as recited in claim 1 wherein the lower die of the press has a contour that matches a contour of an outer surface of the fan blade body.

6. The method as recited in claim 1 wherein the low density filler is foam.

7. The method as recited in claim 6 wherein the low density filler is aluminum foam.

8. The method as recited in claim 1 wherein the fan blade body is made of aluminum or an aluminum alloy.

9. The method as recited in claim 1 wherein the low density filler is compressed and partially bonded to the fan blade body concurrently.

10. The method as recited in claim 1 wherein the cavity comprises a plurality of cavities and the piece of low density filler comprises a plurality of low density filler, and one of the plurality of low density filler is received in one of the plurality of cavities.

11. The method as recited in claim 1 wherein the low density filler is positioned in the cavity in a solid state.

12. A method of forming a fan blade, the method comprising the steps of:
 applying an adhesive in each of a plurality of cavities of an inner exposed surface of a fan blade body;
 positioning one of a plurality of pieces of low density filler in each of the plurality of cavities after the step of applying the adhesive in each of the plurality of cavities, wherein an upper surface of the plurality of pieces of low density filler is located above the inner exposed surface of the fan blade body, and the plurality of pieces of low density filler have a density lower than a density of a material of the fan blade body;
 positioning the fan blade body in a lower die of a press, wherein the lower die of the press has a contour that matches a contour of an outer surface of the fan blade body; and
 applying pressure to the inner exposed surface of the fan blade body with an upper die of the press to compress the plurality of pieces of low density filler such that the upper surface of the plurality of pieces of low density filler is approximately flush with the inner exposed surface of the fan blade body, wherein the step of applying pressure to the inner exposed surface of the fan blade body includes compressing the upper surface of the plurality of pieces of low density filler below the inner exposed surface of the fan blade body and then allowing the plurality of pieces of low density filler to spring back such that the upper surface of the plurality of pieces of low density filler is substantially flush with the inner exposed surface of the fan blade body, and
 incorporating the fan blade body into the fan blade.

13. The method as recited in claim 12 wherein the adhesive is partially cured during the step of applying pressure to the inner exposed surface of the fan blade body.

14. The method as recited in claim 12 wherein the adhesive is urethane.

15. The method as recited in claim 12 wherein the lower die of the press has a contour that matches a contour of an outer surface of the fan blade body.

16. The method as recited in claim 12 wherein the plurality of pieces of low density filler are foam.

17. The method as recited in claim 16 wherein the plurality of pieces of low density filler are aluminum foam.

18. The method as recited in claim 12 wherein the fan blade body is made of aluminum or an aluminum alloy.

19. The method as recited in claim 12 wherein the plurality of pieces of low density filler are compressed and partially bonded to the fan blade body concurrently.

* * * * *